United States Patent [19]

Usui

[11] Patent Number: 5,195,081
[45] Date of Patent: Mar. 16, 1993

[54] OPTICAL APPARATUS FOR EFFECTING RECORDING AND/OR REPRODUCING OF INFORMATION ON/FROM AND OPTICAL INFORMATION RECORDING MEDIUM

[75] Inventor: Masayuki Usui, Yokohama, Japan

[73] Assignee: Canon Kabushiki Kaisha, Tokyo, Japan

[21] Appl. No.: 884,237

[22] Filed: May 11, 1992

Related U.S. Application Data

[63] Continuation of Ser. No. 340,785, Apr. 20, 1989, abandoned.

[30] Foreign Application Priority Data

Apr. 22, 1988 [JP] Japan .................................. 63-098395
Apr. 22, 1988 [JP] Japan .................................. 63-098397

[51] Int. Cl.⁵ ............................ G11B 7/00; G01J 1/20
[52] U.S. Cl. ................................. 369/112; 369/44.23; 250/201.5
[58] Field of Search .................. 369/112, 44.23, 44.24, 369/44.41, 44.42, 44.14, 44.11, 118, 121; 250/201.5, 201.1; 235/454, 455

[56] References Cited

U.S. PATENT DOCUMENTS

| 4,152,586 | 5/1979 | Elliott et al. | 369/44.42 |
| 4,283,777 | 8/1981 | Curry et al. | 369/32 |
| 4,287,413 | 9/1981 | Kanamaru | 369/44.23 |
| 4,464,741 | 8/1984 | Compaan | 369/45 |
| 4,577,301 | 3/1986 | Matthews et al. | 369/44 |
| 4,585,933 | 4/1986 | Ando | 369/44.24 |
| 4,598,393 | 7/1986 | Pierce et al. | 369/109 |
| 4,811,194 | 3/1989 | Tominaga | 369/44.32 |
| 4,841,507 | 7/1989 | Imai et al. | 369/44.23 |
| 4,886,959 | 12/1989 | Hoshi et al. | 369/112 |
| 4,900,910 | 2/1990 | Doi | 369/44.23 |

FOREIGN PATENT DOCUMENTS

61-283043 12/1986 Japan.

Primary Examiner—Aristotelis Psitos
Assistant Examiner—Thang V. Tran
Attorney, Agent, or Firm—Fitzpatrick, Cella, Harper & Scinto

[57] ABSTRACT

Disclosed is a device for reproducing information from an information recording medium having, on its information recording surface, a surface layer transmitting light therethrough. The information reproducing device includes a light source generating an illuminating light beam, a photodetector for receiving light from the information recording medium illuminated by the light beam from the light source, information reproduction being effected by the result of the detection by the photodetector, and an illuminating optical system for condensing the light beam from the light source and for directing it onto the information recording medium, the position of the condensing point by the illuminating optical system being spaced apart from the information recording surface of the information recording medium during the information reproduction by the detection by the photodetector.

9 Claims, 8 Drawing Sheets

OPTICAL APPARATUS FOR EFFECTING RECORDING AND/OR REPRODUCING OF INFORMATION ON/FROM AND OPTICAL INFORMATION RECORDING MEDIUM

This application is a continuation of prior application, Ser. No. 07/340,785 filed Apr. 20, 1989, now abandoned.

BACKGROUND OF THE INVENTION

1. Field of the Invention

This invention relates to an optical information recording and/or reproducing apparatus for effecting recording of information on and/or reproduction of information from an optical information recording medium, and in particular to an optical information reproducing apparatus for effecting reading of signals from a plurality of information bits by the use of a two-dimensional sensor array, and to an apparatus capable of reproducing the information of a plurality of tracks at one time.

2. Related Background Art

Various forms such as an optical disk, an optical card and an optical tape are known as the forms of a medium for recording and reproducing information by the use of light. These have their own characteristics and are properly used in conformity with desired purposes and uses, and among them, the optical card is considered to widen its use in the future because of its ease of manufacture, its good portability and its good accessibility.

There are optical cards of the type which are capable of recording and reproduction, and of the type which are capable of only reproduction. As an optical card of the type which is capable of only reproduction, there is known one in which information is formed as binary signal patterns of different reflectances on a recording medium by a technique such as photolithography. When the information is to be reproduced, the medium surface of the optical card is illuminated and the recorded pattern on the medium surface is imaged on a sensor through an optical system to thereby read the intensity distribution of the image.

Figure 1:
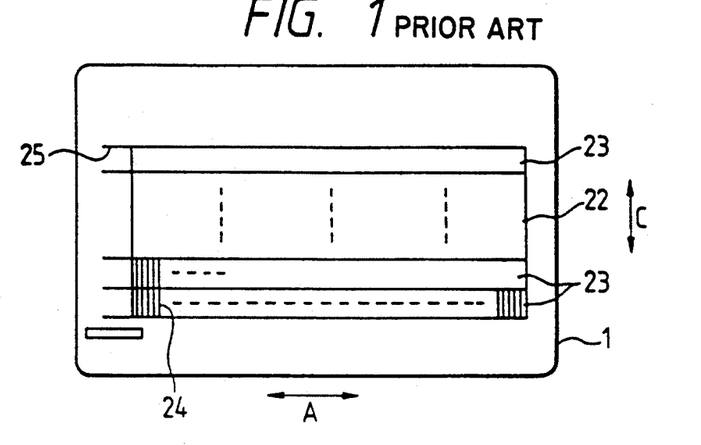
FIG. 1 is a schematic plan view showing the recording format of an optical card.

FIG. 1 of the accompanying drawings is a schematic plan view showing the recording format of an optical card according to the prior art.

In FIG. 1, a recording area 22 is provided on the optical card 1 which is a recording medium, and the recording area 22 is formed with a plurality of bands 23 arranged therein. Further, the bands 23 are formed with a number of tracks 24 arranged therein, and each track 24 has an information capacity on the order of several tens to one hundred bits. The bands 23 are partitioned by reference lines 25. The arrow A indicates the direction of movement of the optical card 1 during reproduction.

Figure 2:
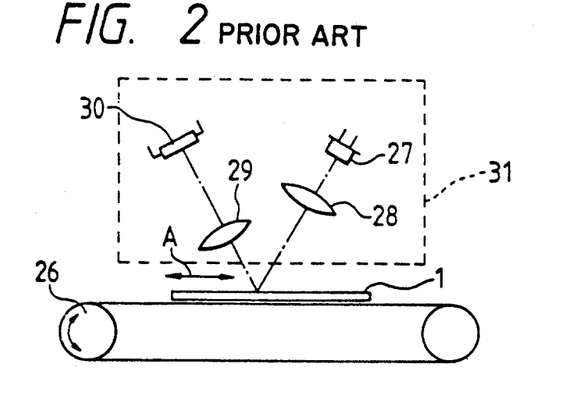
FIGS. 2 and 3 schematically show the constructions of optical card reproducing apparatuses according to the prior art.

FIG. 2 of the accompanying drawings schematically shows the construction of an optical card reproducing apparatus.

In FIG. 2, the optical card 1 is movable in the direction of arrow A by a rotating mechanism 26. Information recorded on the optical card 1 is read and reproduced for each track by an optical head 31. Light, from a light source 27 such as an LED is condensed on the optical card 1 by an illuminating optical system 28 and illuminates the optical card 1. An imaging optical system 29 is disposed so that the optical axis thereof is in the exact opposite relation with the optical axis of the illuminating optical system 28 relative to the medium surface of the optical card 1, and the light flux reflected on the optical card 1 is imaged on a one-dimensional sensor array 30 by the imaging optical system 29, and an electrical signal corresponding to the information recorded on the track 24 is output from the sensor array 30. When the reading of the track 24 is terminated, the optical card 1 is moved in the direction of arrow A or the optical head 31 is moved in the direction of arrangement of the bands 23 (the direction of arrow C in FIG. 1), and the reading of the information of the next track is effected in a similar manner.

Figure 3:
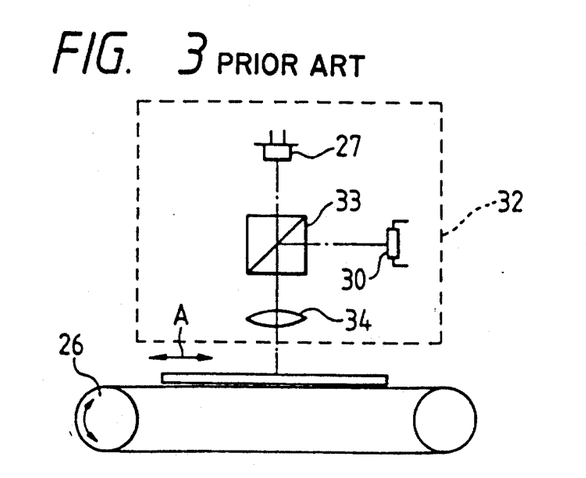

FIG. 3 of the accompanying drawings schematically shows the construction of another example of the optical card reproducing apparatus according to the prior art. The apparatus shown in FIG. 3 is similar in basic construction to the apparatus of FIG. 2, but partly differs in the optical system device of the optical head 32. That is, the light from the light source 27 such as an LED vertically illuminates the medium surface of the optical card 1 via a half-mirror 33 and an optical system 34 serves both as an illuminating system and an imaging system, and the light flux reflected by the medium surface passes through the optical system 34 and is thereafter reflected by the half-mirror 33 and is imaged on the one-dimensional sensor array 30. In the other points, the construction and operation of the apparatus of FIG. 3 are similar to those of the apparatus of FIG. 2.

However, there have been several problems when the information is to be reproduced from the optical card by the use of such a prior-art reproducing apparatus.

The first problem arises when the reproducing apparatus as shown in FIG. 2 is used. It is that since the optical axes of the illuminating system 28 of the optical head and the imaging optical system 29 are inclined with respect to the medium surface of the optical card 1, the imaging position on the one-dimensional sensor array is moved by the inclination or the vertical movement of the medium surface and deviates from the light-receiving surface of the sensor and thus, information reproduction fails to be correctly accomplished in some cases.

The second problem arises when the reproducing apparatus as shown in FIG. 3 is used. If the light source 27 such as an LED is used for illumination, the light flux emitted from the light source 27 is transmitted through and is reflected by the half mirror 33, whereafter it arrives at the sensor 30 and therefore, the quantity of light decreases remarkably. Therefore, if an attempt is made to increase the reproducing speed, it is necessary to use an expensive LED of high luminance or use a sensor of high sensitivity, but there is a limit in any of these countermeasures, and cost unavoidably becomes higher as a reproducing apparatus used for the reproduction of a medium such as the optical card 1 which is used in great quantity.

Here, if a semiconductor laser is used instead of an LED, the above-noted problem can be solved even by a laser of relatively low output and accordingly low cost due to its high luminance and its good directionality. However, a new problem will arise. That is, due to the high coherency of the laser, the light reflected by the surface of the optical card 1 and the light reflected by the medium surface interfere with each other, whereby harmful interference fringes are formed on the sensor and they appear as noise in reproduced signals. In such a case, forming an anti-reflection film on the surface of the optical card results in a higher cost as the medium used in great quantity as previously described, and this is not preferable. Also, the film may peel off during transportation and this in turn leads to a problem in practical use.

As another example of the optical card according to the prior art, there is one which is capable of both recording and reproduction as previously described. Description will hereinafter be made of an information recording-reproducing apparatus according to the prior art using such an optical card.

Here, various methods of causing a light beam applied to the optical card to scan the optical card are conceivable, but a method whereby the applied position of the light beam is reciprocally moved relatively straight on the medium and the applied position of the beam is relatively moved sequentially on the medium in a direction orthogonal to the direction of the reciprocal movement is characterized in that the mechanism is simple and the effective space on the medium is large.

Figure 4:
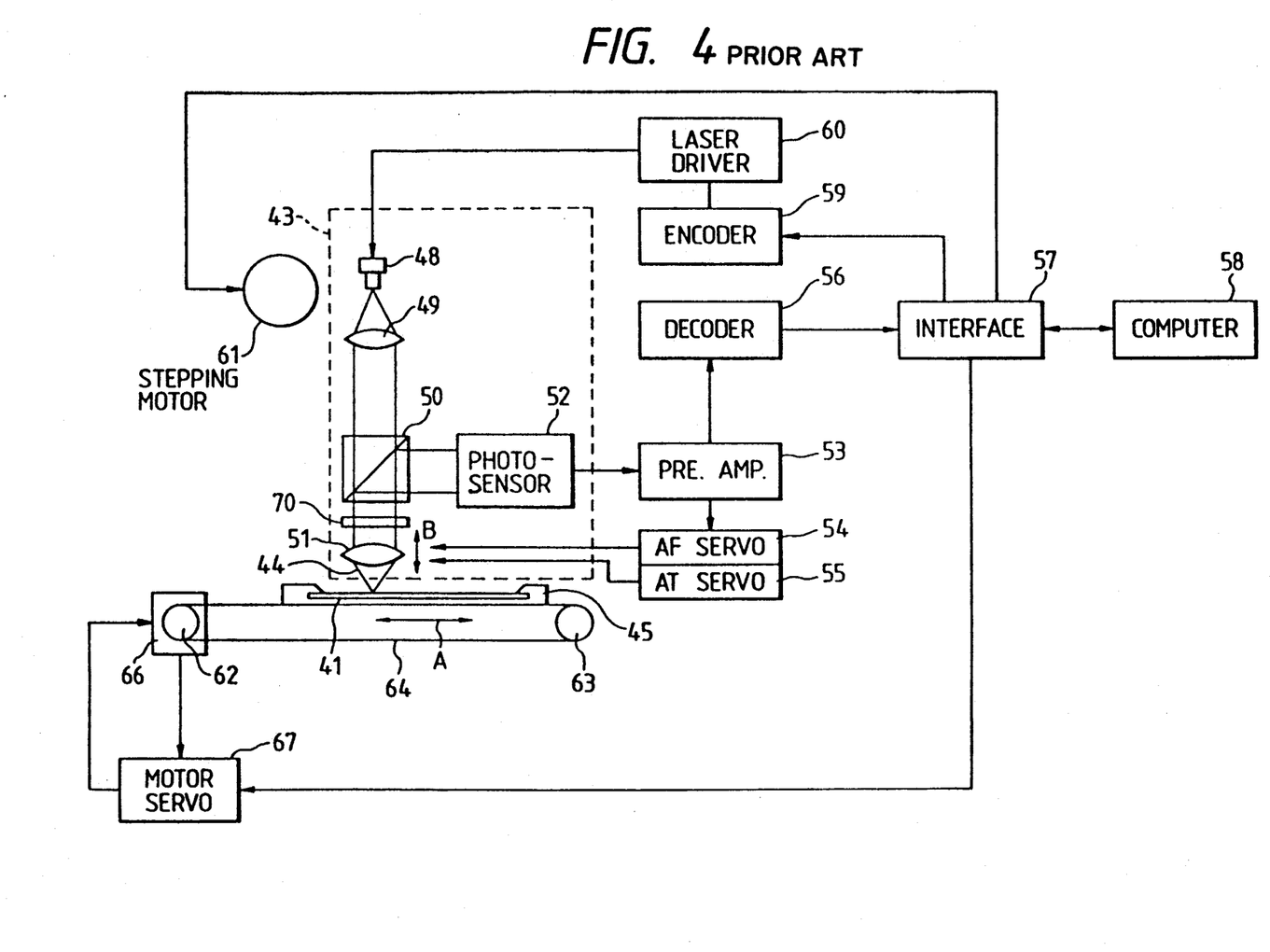
FIG. 4 is a block diagram of an optical information recording-reproducing apparatus according to the prior art.

An example of the optical information recording-reproducing apparatus adopting such a method is shown in FIG. 4 of the accompanying drawings. FIG. 4 is a block diagram of the apparatus.

In FIG. 4, the reference numeral 41 designates an optical card on which information is to be recorded, the reference numeral 43 denotes an optical head (the portion outlined by a dotted line in FIG. 4), the reference numeral 44 designates a light beam, the reference numeral 45 denotes a supporting table for supporting the optical card 41 thereon, the reference numeral 48 designates a laser, and the reference numeral 49 denotes a collimator lens. The reference numeral 50 designates a polarizing beam splitter, and the reference numeral 70 denotes a quarter wavelength plate, and the light travelling downward as viewed in FIG. 4 is transmitted by a combination of these two members, but the light travelling upward as viewed in FIG. 4 is bent in a perpendicular direction. The reference numeral 51 designates a pick-up lens which serves to condense a parallel light on the optical card 41.

The reference numeral 52 denotes a photosensor, the reference numeral 53 designates a preamplifier, the reference numeral 54 denotes an auto focusing servo, the reference numeral 55 designates an auto tracking servo, the reference numeral 56 denotes a decoder, the reference numeral 57 designates an interface, the reference numeral 58 denotes a computer, the reference numeral 59 designates an encoder, the reference numeral 60 denotes a laser driver, and the reference numeral 61 designates a stepping motor which serves to move the optical head 43 in a direction perpendicular to the plane of the drawing sheet.

The reference numerals 62 and 63 denote pulleys over which a belt 64 is passed. The supporting table 45 for supporting and fixing the optical card 41 thereon is mounted on the belt 64. The pulley 62 is mounted on the shaft of a motor 66, and the optical card 41 is reciprocally moved in the direction of arrow A by the revolution of the motor 66.

The operation of the apparatus shown in FIG. 4 will now be described. Description will first be made of the case of reproduction. In FIG. 4, a light beam emitted from the laser 48 is collimated by the collimator lens 49, passes through the polarizing beam splitter 50 and the quarter wavelength plate 70, is condensed by the pick-up lens 51 and forms a minute spot on the optical card 41. The reflected light from the optical card 41 is modulated depending on whether there is an information pit in the portion irradiated by the minute spot, and this modulated light is again made into parallel light by the pick-up lens 51 and is caused to enter the photosensor 52 by the polarizing beam splitter 50. The photosensor 52 detects any variation in the quantity of the modulated light, and converts the variation into an electrical signal and supplies it to the preamplifier 53. A signal is supplied from the preamplifier 53 to the auto focusing servo 54, and the pick-up lens 51 is moved in the direction of arrow B by the signal from the auto focusing servo 54 with the aid of an actuator, not shown, whereby the distance between the pick-up lens 51 and the optical card 41 is controlled so that the light beam 44 is focused on the optical card 41.

A signal is also supplied from the preamplifier 53 to the auto tracking servo 55, and the signal from the auto tracking servo 55 moves the pick-up lens 51 in a direction perpendicular to the plane of the drawing sheet with the aid of the actuator, not shown, to thereby control the light beam 44 so as to be focused at a predetermined position. Several specific methods have been proposed regarding the auto focusing servo 54 and the auto tracking servo 55, and for example, there is proposed an example in which the light beam 44 is divided into a plurality of beams by a grating or the like to preform a track for auto focusing or auto tracking (hereinafter referred to as the guide track) on the optical card 41 and information is reproduced by at least one of the plurality of light beams and signals for auto focusing and auto tracking are taken out by the other beams.

Further, the signal from the preamplifier 53 is sent to the decoder 56, in which it is subjected to electrically necessary processing, and is thereafter supplied to the interface 57. From the interface 57, an information signal is sent to the computer 58. Also, from the interface 57, a signal is sent to the encoder 59, and is modulated as required, whereafter it controls the oscillation of the laser 48 via the laser driver 60.

Further, from the interface 57, a signal is sent to the stepping motor 61 and the motor servo 67, whereby control of the position of the optical head 43 in a direction perpendicular to the plane of the drawing sheet and control of the revolution of the motor 66 are effected.

Description will now be made of the case of recording. Again in the case of recording, the operation is substantially similar to the operation in the case of reproduction, but in the case of recording, a light stronger than in the case of reproduction is emitted from the laser 48. As in the case of reproduction, the light beam is imaged on the optical card 41 and information is recorded on the optical card 41 in accordance with the modulation of the laser beam. Again in the case of recording, it is usually necessary to effect auto focusing or auto tracking, and various methods therefor have been proposed. For example, the light beam is divided into at least one strong beam (for writing) and at least one weak beam (for focusing or auto tracking) by means such as a grating, and writing can be accomplished by the strong beam while the guide track preformed on the optical card 41 is being tracked by the weak beam.

In the recording-reproducing apparatus described above, information pits are recorded or reproduced one by one by the rectilinear reciprocal movement of the optical card. However, the apparatus having such a function suffers from the disadvantage that a long time is required particularly when a great deal of information is to be reproduced. As a means for solving this, there is conceived a method of increasing the speed of the reciprocal movement of the card, but this method in turn has the difficulty that mechanical vibration is increased to adversely affect the reproduced signal or increase the load of the card feeding mechanism or the motor.

If reproduction alone is to be effected, the speed of the reciprocal movement of the card can be decreased by using a method of reading a plurality of information tracks at one time by the use of a line sensor such as a CCD, but to add such a line sensor to an apparatus for both recording and reproduction, presents the necessity of carrying a discrete head exclusively for reading on the apparatus, which in turn avoidably leads to the bulkiness and complication of the apparatus, and sometimes to the necessity of additionally providing auto focusing and auto tracking mechanisms to the head exclusively for reading.

Also, to read a plurality of information tracks at one time, it is necessary to illuminate these tracks at one time, but if an incoherent light source such as an LED is used for this purpose, it will be difficult to illuminate the necessary area with a high intensity of illumination, and it will also become difficult to increase the reproduction rate because the utilization rate of the light is reduced by the light passing through a beam splitter in the optical head.

If a light source being in a rectilinearly polarized state and having high luminance, such as a semiconductor laser, is used, an isolated optical system using a combination of a polarizing beam splitter and a wavelength plate can be used. Therefore, the utilization rate of the light is improved, while the reflected light from the surface of the protective layer of the optical card is superposed on and interferes with the reflected light from the medium surface, and as in the aforedescribed reproducing apparatus, this leads to the new problem that noise harmful to the reproduction of signals is produced.

SUMMARY OF THE INVENTION

In view of the above-noted disadvantages peculiar to the prior art, the present invention has as its primary object the provision of an information recording and/or reproducing apparatus which is high in the reliability of information reproduction.

The above object is achieved, in one embodiment of the present invention, by an optical information recording and/or reproducing apparatus in which a light beam is condensed on a recording medium surface having a transparent protective layer through an objective lens to thereby accomplish at least the reproduction of information, characterized by the provision of means for keeping the objective lens at a predetermined distance away from the in-focus position relative to the recording medium surface during the reproduction of information.

Also, the above object is achieved, in another embodiment of the present invention, by an optical information recording and/or reproducing apparatus for recording information on and/or reproducing information from an optical information recording medium by the application of a light beam thereto, characterized in that during recording, a light beam is stopped down into a minute spot to form a row of information tracks on the medium and thereby accomplish recording, and during reproduction, a defocused light beam is applied so as to irradiate a plurality of rows of information tracks to thereby accomplish reproduction.

DESCRIPTION OF THE PREFERRED EMBODIMENTS

According to a reproducing apparatus which will hereinafter be described, the reflected light from the surface of a protective layer is imaged in a smaller area on a surface on which a photodetector for reproducing information lies than a light flux which illuminates a medium surface, and the photodetector is disposed at a position which is not affected by that light flux and therefore, it becomes possible to eliminate the adverse affect of the reflected light from the surface of the protective layer.

Some specific embodiments of the optical information recording and/or reproducing apparatus of the present invention will hereinafter be described in detail with reference to the drawings.

Figure 5:
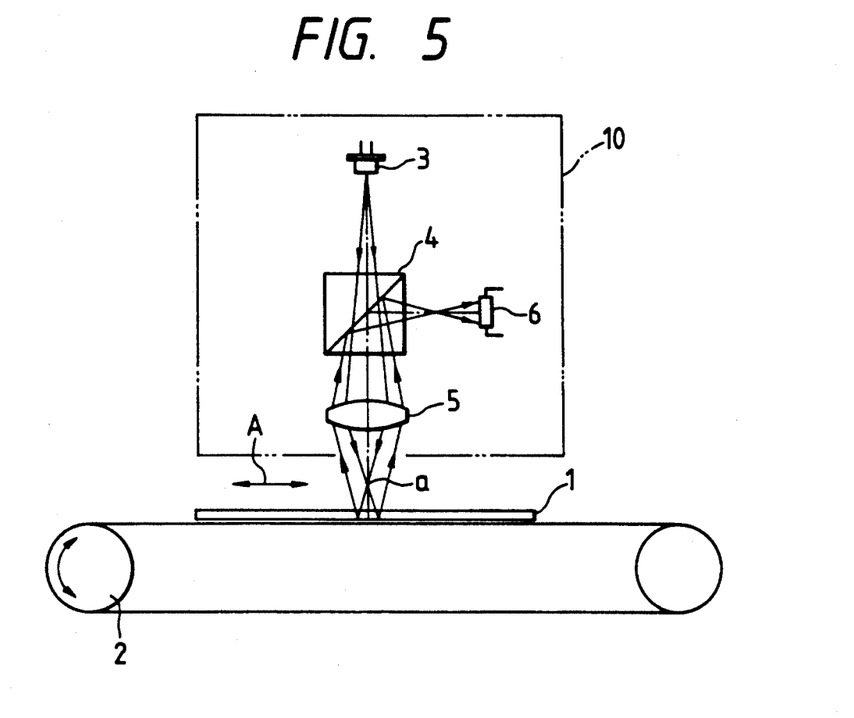
FIG. 5 schematically shows the construction of an embodiment of the optical information recording and/or reproducing apparatus of the present invention.

FIG. 5 schematically shows the construction of the optical information recording and/or reproducing apparatus of the present invention. In FIG. 5, the reference numeral 1 designates an optical card, the reference numeral 10 denotes an optical head for reproducing information, and the reference numeral 2 designates a rotating mechanism for moving the optical card 1 in the direction of arrow A. The optical head 10 is comprised of a semiconductor laser 3 which is a light source, a beam splitter 4, an objective lens 5 and a CCD which is a one-dimensional array-like sensor 6.

A light beam emitted from the semiconductor laser 3 is transmitted through the beam splitter 4, whereafter it is once converged at a position a above the optical card 1 by the objective lens 5, and thereafter irradiates the medium surface of the optical card 1 from a direction substantially perpendicular thereto in a defocused state. The light beam reflected by the medium surface again passes through the objective lens 5 and is reflected by the beam splitter 4, whereafter it is collected on the CCD 6 lying at a position conjugate with the medium surface of the optical card 1.

Figure 6:
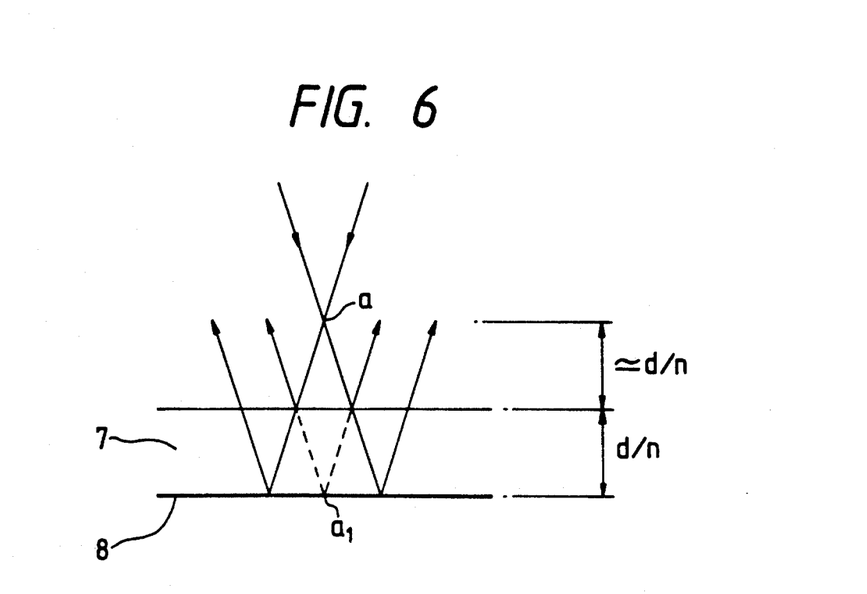
FIG. 6 illustrates a method of illuminating an optical card in the embodiment of FIG. 5.

FIG. 6 illustrates in greater detail the manner in which the light beam irradiates the optical card 1. In FIG. 6, the letter a represents the aforementioned converged position of the light beam, and this position is kept substantially at a distance d/n from the surface of the transparent protective substrate 7 of the optical card. Letter d represents the thickness of the protective substrate, and n represents the refractive index thereof. The medium surface 8 of the optical card, when optically viewed, exists at a position of d/n from the surface of the protective substrate. Thus, the medium surface 8 has its predetermined area irradiated in the defocused state, while the light beam reflected by the surface of the protective substrate 7 (indicated by broken lines in FIG. 6) diverges with a position $a_1$ on the medium surface substantially as the origin. That is, the virtual image $a_1$ of he condensing point a is formed on the medium surface by the reflected light from the surface.

Figure 7:
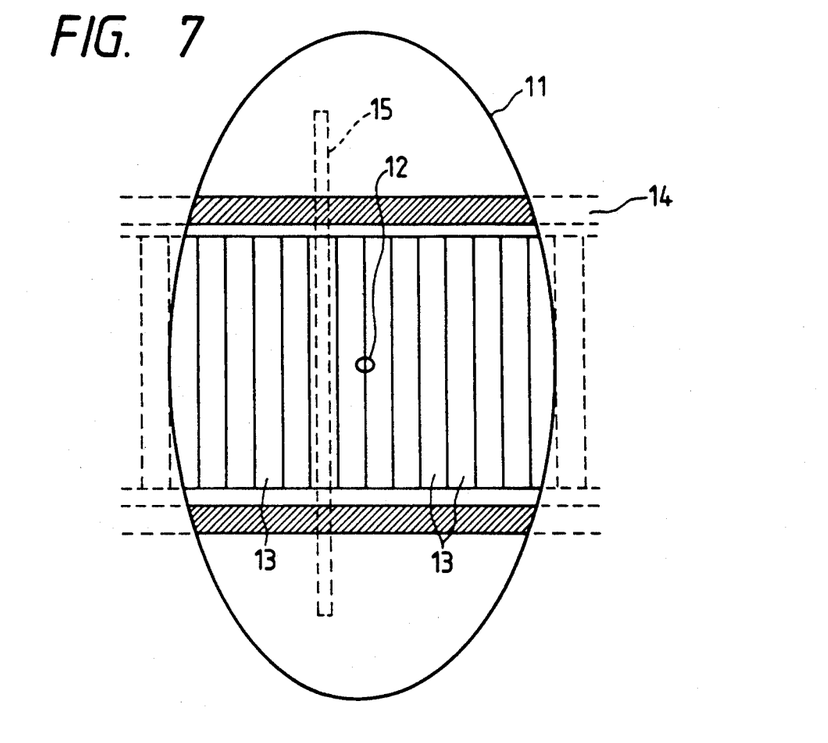
FIG. 7 illustrates the relation between an image formed on the light-receiving surface of the apparatus of the FIG. 5 embodiment and a sensor.

FIG. 7 shows the projected image of the optical card 1 projected onto the light-receiving surface of the CCD 6. In the figure, the reference numeral 14 designates a reference line formed on the medium surface, and the reference numeral 13 denotes tracks including information, and only an elliptical area 11 illuminated by the light beam is projected and imaged as an image. The reflected light from the protective substrate 7 of the optical card is imaged as a minute light spot 12, as shown. The light-receiving area of the CCD for reading out the information recorded on the tracks 13 is provided at a position indicated by broken line 15, i.e., a position slightly deviated from the light spot 12 so as not to overlap the light spot 12. By the CCD being placed at such a position, reading-out of a signal can be accomplished without being affected by the reflected light from the surface, that is, with interference fringes and harmful background light being removed. The light-receiving area of the CCD 6 is located at a position somewhat deviated from the optical axis relative to the optical system, but since the light spot 12 is small, i.e., on the order of several μm, the amount of deviation may be very slight and will not affect the imaging performance. A similar effect can be obtained by deviating the semiconductor laser from the optical axis, instead of deviating the CCD 6.

The light beam emitted from the semiconductor laser generally has an elliptical distribution and therefore, it is preferable to illuminate the medium so that as shown in FIG. 7, on the medium surface, the direction of the major axis coincides with the direction of arrangement of the light-receiving elements of the CCD 6. Also, to enhance the utilization rate of light, it is possible to use a polarizing beam splitter as the aforementioned beam splitter, and dispose a quarter wavelength plate between the polarizing beam splitter and the objective lens.

The extent over which the medium surface is illuminated differs depending on the length of the band read at one time by the CCD, and for example, if the NA of the illuminating light beam is 0.4 and the thickness of the protective substrate is 0.4 mm and the refractive index of the protective substrate is 1.5, the diameter of the irradiated area on the medium surface will be about 230 μm and the irradiated area will have a practically sufficient extent. The reflected light from the surface need not always be imaged as a spot on the light-receiving surface of the CCD 6, but may be condensed to such a small size that will not harm the reading of a signal. Such a state can be realized by keeping the converged position a of the light beam shown in FIG. 6 at a suitable position above the protective substrate. The position of the CCD 6 need neither always be the position as shown, but may be any position if the illuminated area is sufficiently wide.

Figure 8A:
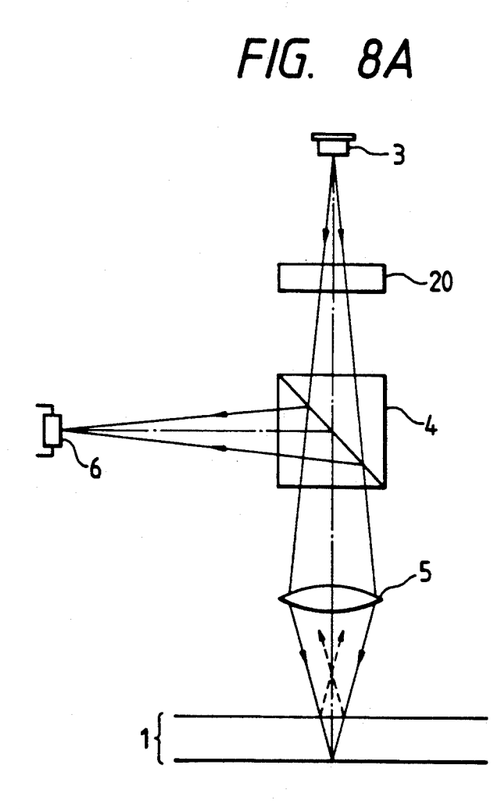
FIGS. 8A and 8B illustrate the optical head unit of the optical information recording and/or reproducing apparatus of the present invention.
Figure 8B:
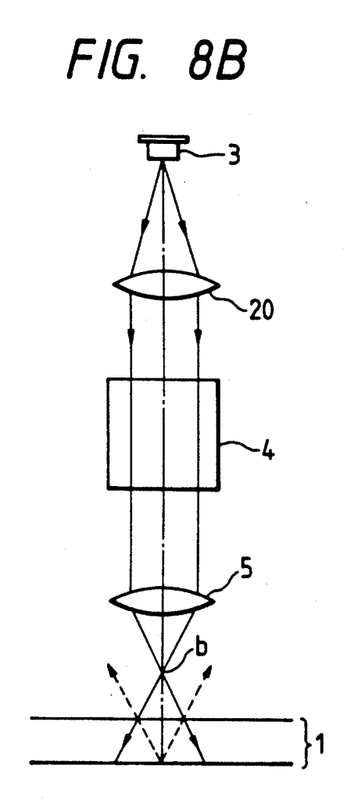

FIGS. 8A and 8B illustrate another embodiment of the present invention, and represent the optical head unit of the optical information reproducing apparatus according to this embodiment. FIG. 8A is a side view of the optical head in the direction of movement of the optical card, and FIG. 8B is a side view of the optical head in a direction orthogonal to the direction of movement. In FIGS. 8A and 8B, members similar to those in the first embodiment are given similar reference numerals and need not be described. The difference of the present embodiment from the first embodiment is that a cylindrical lens 20 is inserted in the light beam emitted from the semiconductor laser 3. The cylindrical lens 20 has the function of condensing the light beam on the medium surface of the optical card 1 onto a line and enhancing the efficiency of illumination. The light beam emitted from the semiconductor laser 3 is set so that as shown in FIG. 8B, the position of the focal line b condensed by the objective lens 5 in the cross-section in which the cylindrical lens has a refractive power keeps a distance of about d/n above the surface of the protective layer of the optical card.

Figure 9:
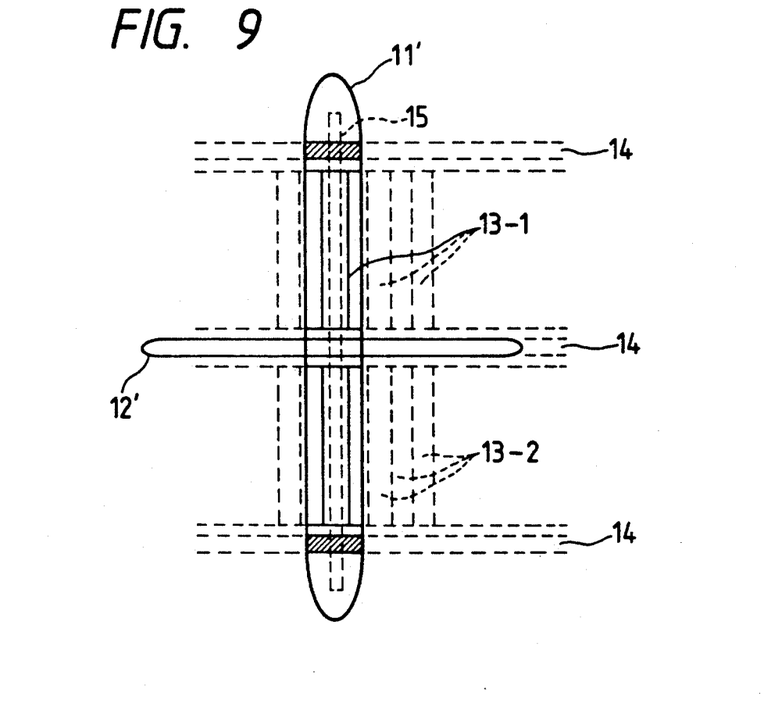
FIG. 9 illustrates the relation between an image formed on the light-receiving surface in the embodiment of FIG. 8 and a sensor.

FIG. 9 shows an image which, in such an illuminated condition, is projected onto the light-receiving surface of the CCD 6 placed at a position conjugate with the optical card. In this figure, the reference numeral 11' designates a linear area which illuminates the medium surface, and the reference numeral 12' denotes a linear image formed by the reflected light from the surface of the protective layer being condensed. The other members are similar to those in FIG. 7 and therefore need not be described. In the case of the present embodiment, the reflected light from the surface of the protective layer becomes a linear image and therefore it is difficult to cause it to deviate in the direction of the minor axis of the light-receiving area 15 of the CCD 6, but the object of the present invention can be achieved by preventing the reflected light from overlapping the tracks 13-1 to be read (the reflected light being on reference lines 14), or by deviating the reflected light to the position of the other tracks (e.g. tracks 13-2) than those to be read, as shown.

An example in which the present invention is applied to an optical information recording and/or reproducing apparatus will now be described.

Figure 10:
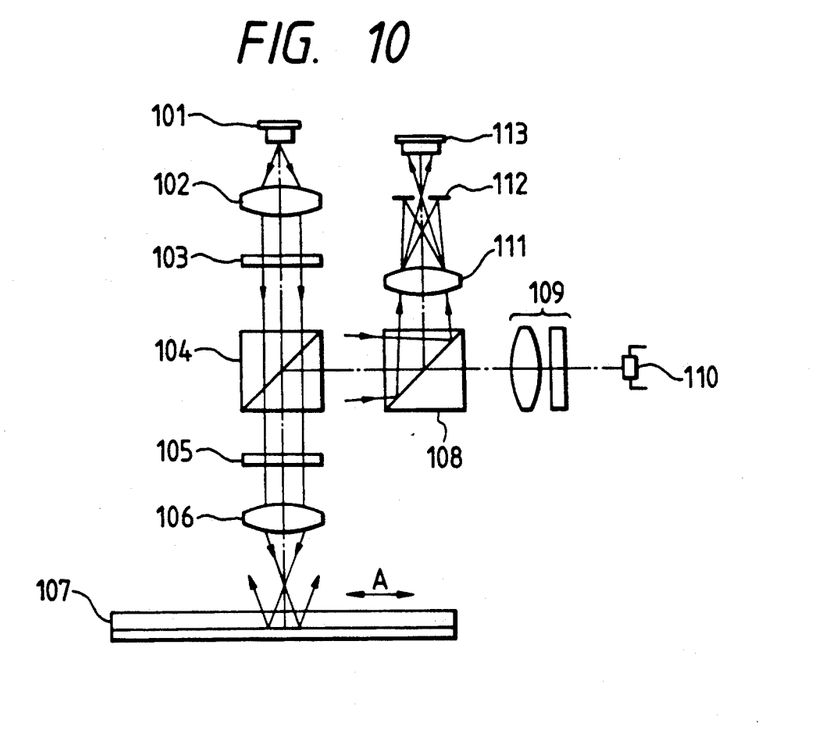
FIG. 10 illustrates the construction of the optical system of an optical head used in an optical information recording and/or reproducing apparatus according to a third embodiment of the present invention.

FIG. 10 is a schematic view showing a third embodiment of the present invention, and shows the optical system of an optical head. This optical system is contained in the optical head 122 of an optical information recording and/or reproducing apparatus which will be described later with reference to FIG. 12. In FIG. 10, the reference numeral 101 designates a semiconductor laser, the reference numeral 102 denotes a collimator lens, the reference numeral 103 designates a diffraction grating, the reference numeral 104 denotes a polarizing beam splitter, the reference numeral 105 designates a quarter wavelength plate, the reference numeral 106 denotes an objective lens, the reference numeral 107 designates an optical card which is a recording medium, the reference numeral 108 denotes a non-polarizing beam splitter, the reference numeral 109 designates an astigmatism generating lens comprising a combination of a spherical lens and a cylindrical lens, the reference numeral 110 denotes a photosensor, the reference numeral 111 designates a condensing lens, the reference numeral 112 denotes an aperture, and the reference numeral 113 designates a photodiode array.

When information is to be recorded on the optical card 107, the light beam emitted from the semiconductor laser 101 and collimated by the collimator lens 102 is divided into a main beam for recording and two sub-beams for tracking by the use of the diffraction grating 103, whereafter these beams are stopped down into minute spots on the recording surface of the optical card 107 by the objective lens 106 through the polarizing beam splitter 104 and the quarter wavelength plate 105. The optical card 107 is reciprocally moved in the directions of arrow A by driving means which will be described later, and a row of information pits is formed on the tracks by the spots modulated in accordance with the information to be recorded. To record the row of pits, the techniques of auto focusing and auto tracking become necessary, and as regards auto focusing, the light beam reflected by the optical card 107 and reflected by the polarizing beam splitter 104 via the objective lens 106 and the quarter wavelength plate 105 passes through the non-polarizing beam splitter 108, whereafter the astigmatism generated by the astigmatism generating lens 109 is detected by the use of the photosensor 110, whereby a focus error signal is obtained, and in order to keep the objective lens 106 always at the in-focus position by the principle of the well-known astigmatism method on the basis of such a signal, feedback servo is applied to an actuator, not shown. As regards auto tracking, it is effected by the use of the aforementioned sub-beams generated by the diffraction grating 103, i.e., by the so-called three-beam method. It is to be understood that a guide track for effecting auto tracking is preformed on the medium surface of the optical card 107. The tracking technique by the three-beam method is well known and therefore need not be described in detail.

Description will now be made of a method of reproducing the recorded information. During the reproduction of the information, the objective lens 106 is held at a position spaced apart by a predetermined distance from the optical card 107, as shown in FIG. 10, by a predetermined bias current applied to the actuator, not shown. Accordingly, the light beam is once imaged as a spot in the air, whereafter in its defocused state, it irradiates the medium surface of the optical card 107. The light reflected from the optical card passes through the objective lens 106 and the quarter wavelength plate 105 conversely to the route during the incidence, and is reflected by the polarizing beam splitter 104 and thereafter, is further reflected by the non-polarizing beam splitter 108, and arrives at the photodiode array 113 via the condensing lens 111 and the aperture 112. The position of the spot imaged by the objective lens 106 is a position of about d/n above the surface of the optical card 107. Letter d represents the thickness of the optical card 107, and n represents the refractive index of the protective layer. When optically viewed, the medium surface exists d/n below the surface of the protective layer and thus, the position of the spot is a position substantially symmetrical with the medium surface with respect to the surface of the protective layer. The light-receiving surface of the photodiode array 113 is provided at a position conjugate with the medium surface of the optical card 107 irradiated in the defocused state. At this time, the reflected light from the surface of the protective layer is condensed as a spot on the light-receiving surface. The aperture 112 serves to intercept high-order diffracted lights such as the sub-beams generated by the diffraction grating 103, and is disposed near the imaged position of the light beam rearward of the condensing lens 111 and passes only the 0-order light therethrough. This aperture is for preventing the sub-beams from becoming noise on the photodiode array 113, and is not always necessary depending on the degree of the noise. Also, in a case when the sub-beams are not used and the tracking during recording is effected by only a single beam, for example, in the case of a one-beam push-pull system, the aperture 112 is not necessary.

Figure 11:
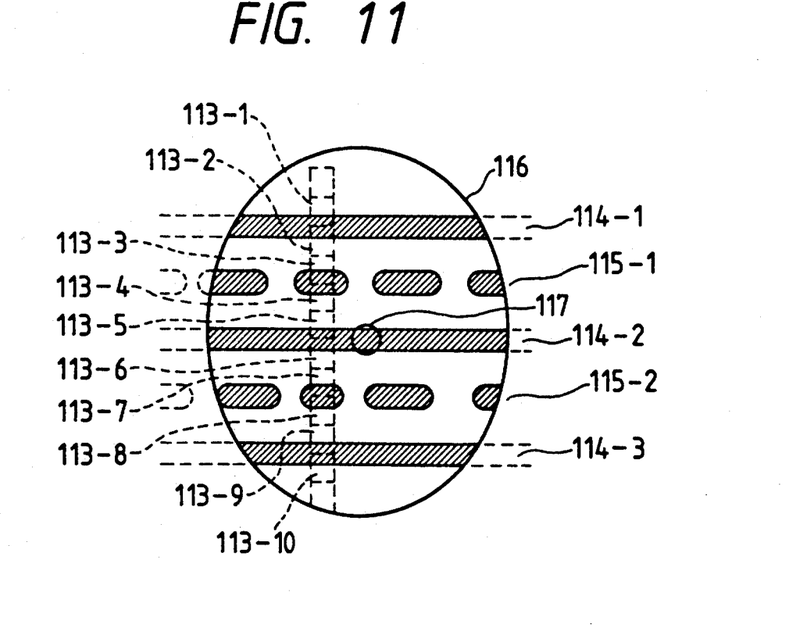
FIG. 11 illustrates the illuminated area on the medium surface of an optical card and a signal detecting method in the third embodiment.

FIG. 11 shows the relation between the state of the medium surface during such information reproduction and the photodiode array used in signal reproduction and auto tracking. Guide tracks 114-1, 114-2, . . . preformed on the medium surface of the optical card 107 are gradation type tracks, and information pit rows 115-1, 115-2, . . . recorded by the light spot likewise represent binary information by gradation. It is to be understood that the relation between the NA of the applied light beam and the defocus amount is adjusted by the objective lens 106 so that two or more information pit rows are included in the illuminated area 116 on the medium surface irradiated in the defocused state as previously described. For example, if the thickness of the protective layer of the optical card 107 is 0.4 mm and the refractive index thereof is 1.5 and the illumination is such that a spot is imaged at a position of d/n above the surface of the protective layer as previously described and the effective NA of the illuminating light beam is 0.4, then the diameter of the illuminated area 116 is about 230 $\mu$m, and if the form of recording is that of the ordinary optical memory, this is a size in which information pit rows corresponding to more than several tens of tracks are sufficiently included.

Array-like small areas 113-1, 113-2, . . . , 113-10 indicated by broken lines in the illuminated area 116 show optical positions corresponding to the respective elements of the photodiode array 113, and the quantity of light in these areas indicated by broken lines is detected. The reproduction signal of the information pit row 115-1 is obtained as the sum signal of the elements 113-3 and 113-4 of the photodiode array, and the reproduction signal of the information pit row 115-2 is obtained as the sum signal of the elements 113-7 and 113-8 of the photodiode array. The tracking during signal reproduction is effected with one of the guide tracks in the illuminated area as a reference. For example, if the guide track 114-1 is the reference during reproduction, a tracking error signal is obtained by taking the difference between the outputs of the elements 113-1 and 113-2, and auto tracking can be accomplished by this error signal and by the use of known means. The auto focusing during signal reproduction will be described later with reference to FIG. 12.

Near the center of the illuminated area 116, the reflected light 117 from the surface of the protective layer of the optical card is condensed in the form of a spot. The elements 113-1, 113-2, . . . of the photodiode array prevent the incidence of the reflected light 117 at a position somewhat deviated from the position at which the reflected light 117 exists. By the reflected light 117 from the surface being thus imaged as a minute spot, interference fringe noise often encountered in a light source of high coherency such as a semiconductor laser can be eliminated and stable signal reproduction and tracking become possible.

Figure 12:
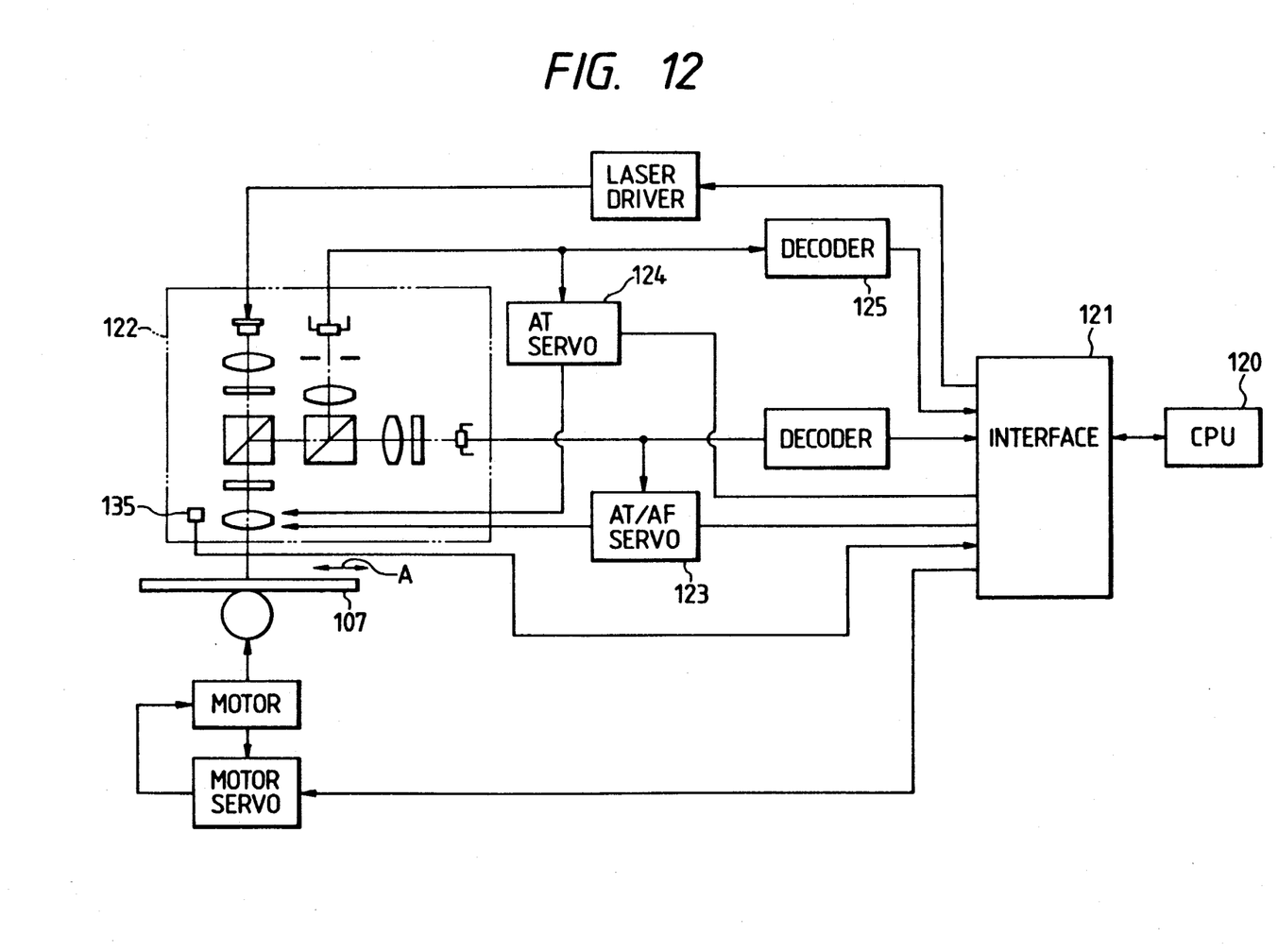
FIG. 12 is a block diagram schematically showing the construction of the system of the apparatus of the third embodiment of the present invention.

FIG. 12 is a schematic block diagram showing the system construction of an optical information recording and/or reproducing apparatus. Control of the entire apparatus is effected by a CPU 120 which is a high-rank control device through an interface 121. The optical system of the optical head shown in FIG. 10 is contained in an optical head 122. When information is to be recorded on the optical card 107, recording is effected on the optical card by a light beam stopped down into a spot while the optical card is being reciprocally moved in the directions of arrow A and while the auto tracking by the three-beam method and the auto focusing by the astigmatism method are being effected by the use of an AT/AF servo circuit 123.

In the optical head 122, there is provided a position detector 135 for detecting the position of the objective lens in the focusing direction relative to an actuator.

During reproduction, the optical card 107 and the optical head 122 are moved while auto focusing is once being effected by the use of the AT/AF servo circuit 123, whereby the position of the objective lens corresponding to each position of the optical card is detected by the position detector 135 and memorized. Subsequently, control for positioning the objective lens at a position higher by the required defocus amount than the memorized position of the object lens corresponding to each position of the optical card is started through the AT/AF servo circuit 123. Also, AT servo is changed over to an AT servo circuit 124 by the output of the photodiode array, and while auto tracking is being effected by this circuit, the pit row information read from the photodiode array enters the CPU via a decoder 125 and provides reproduction information. The reproduction from a plurality of information tracks is done in this manner and accordingly, reproduction can be completed in a shorter time than in the case when tracks are reproduced one by one. However, when for example, information is written in by an amount corresponding to one track and this information is to be reproduced on the spot, it is also possible to effect reproduction in the same manner as in the prior art without effecting the change-over to the AT servo circuit 124.

Figure 13:
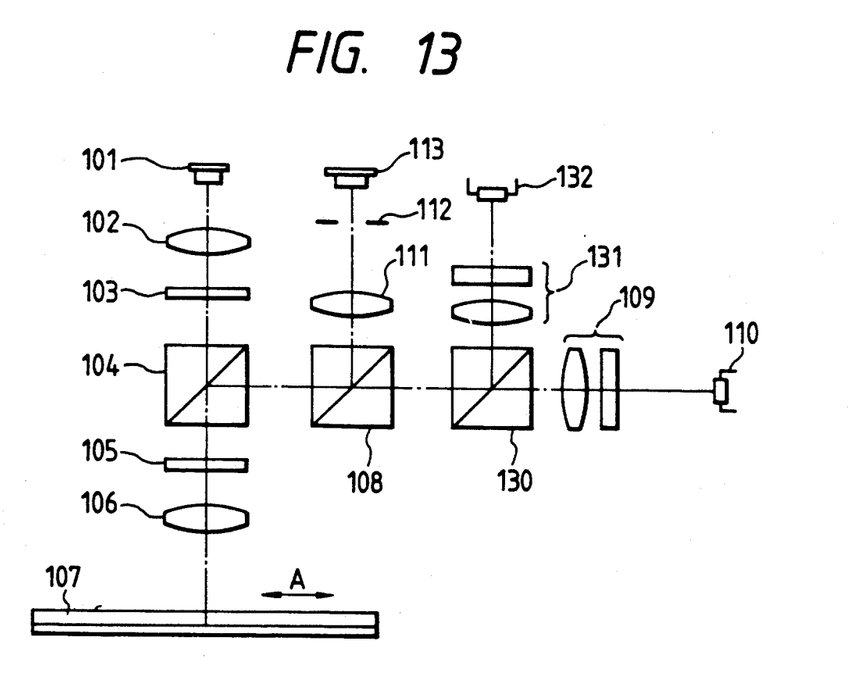
FIG. 13 illustrates the optical system of the optical head of an optical information recording and/or reproducing apparatus according to a fourth embodiment of the present invention.

FIG. 13 illustrates a fourth embodiment of the present invention, and shows the optical system portion of an optical head used in an optical information recording and/or reproducing apparatus. In FIG. 13, members designated by reference numerals 101 to 113 are entirely similar in function to the members shown in FIG. 10 and therefore need not be described. The difference in this embodiment from the embodiment shown in FIG. 10 is that a second non-polarizing beam splitter 130 is provided between the non-polarizing beam splitter 108 and the astigmatism generating optical system 109 and part of the light beam reflected from the medium surface of the optical card 107 is directed to a second photosensor 132 via a second astigmatism generating optical system 131.

The operation of the apparatus when information is to be recorded on the optical card 107 is similar to that of the third embodiment, that is, the light beam is stopped down into a minute spot on the medium surface of the optical card 107, and information pit rows are recorded on the medium surface while auto focusing and auto tracking are being effected on the basis of the output of the photosensor 110.

When reproduction is to be effected, the auto focusing servo system is changed over to a second servo system (not shown) based on the output of the second photosensor 132 by a high-rank control CPU, not shown. By this servo system, the objective lens 106 is located at a position whereat the condensing point is formed at a distance of about d/n (d and n are the same as those described previously) from the surface of the protective layer of the optical card 107, and the spacing between the medium surface of the optical card 107 and the objective lens 106 is always kept constant relative to any fluctuation of the position of the optical card. Auto tracking is also effected in the same manner. That is, even in the defocus illumination condition during reproduction, stable operation always is made possible again during reproduction by providing an optical system capable of detecting tracking and focusing error signals. The reading of information is accomplished by the photodiode array 113 as in the third embodiment. However, in the case of the present embodiment, the signal detection for auto tracking which has been effected by the photodiode array 113 is not effected.

Further, as a modification of the present embodiment, the tracking error signal may be detected by the photodiode array 113 as in the third embodiment, and only the focusing error signal may be output by the photosensor 132. Also, if the depth of focus of the reproducing optical system is sufficiently deep and the necessary depth can be kept by only the mechanical accuracy even if auto focusing is not effected, the focusing error detecting system may be eliminated. Or if use is made of a focusing error detecting system having a sufficiently wide dynamic range, it will also be possible to control the objective lens to a predetermined focus position for the states during both recording and reproduction by the use of a single detecting system.

The present invention is not restricted to the above-described embodiments, but permits various modifications and applications.

For example, in the above-described embodiments, the photodetector has been described as one-dimensional, but a two-dimensional array-like sensor may also be used insofar as the imaging performance permits.

Of course, the present invention can also be applied to other recording mediums than the optical card, in that the adverse affect of the surface of the protective layer of a recording medium surface having a transparent protective layer is eliminated.

According to the optical information reproducing apparatus of the first and second embodiments, a semiconductor laser having high luminance and accordingly high illumination efficiency is used as the light source and therefore, there can be provided an optical information reproducing apparatus of high reliability in which the reproducing speed can be increased and yet harmful noise light generated due to good coherency can be removed. Also, since the light beam is caused to enter the medium surface perpendicularly thereto, the lateral movement of the image on the light-receiving surface by the defocus of the medium does not occur.

Also, according to the optical information recording and/or reproducing apparatus of the third and fourth embodiments, the optical system portion from the light source to the objective lens is the same as the prior-art optical head and a portion of the signal detecting system is added, whereby it becomes possible to provide an optical information recording and/or reproducing apparatus in which reproduction of the information of a plurality of tracks becomes possible by the use of the same light source and moreover, harmful noise such as interference fringes generated by using a laser source can be removed and which is capable of accomplishing high-speed and stable reproduction.

What is claimed is:

1. An apparatus for reproducing information from an information recording medium having an information recording surface and a surface layer on the recording surface for transmitting light therethrough, said apparatus comprising:

a light source for generating a light beam to illuminate the recording medium;

photodetector means for receiving light from the information recording medium illuminated by the light beam generated by said light source, and for reproducing information on the basis of detection of light received by said photodetector means, said photodetector means comprising a detecting optical system and a photodetector, said detecting optical system directing the light beam received from the information recording medium onto said photodetector and said photodetector having a light-receiving surface disposed on a surface conjugate to the information recording surface of the information recording medium through said detecting optical system for receiving the light beam directed from said detecting optical system; and an illuminating optical system for condensing the light beam generated by said light source to a condensing point and for directing the condensed light beam onto the information recording medium, said illuminating optical system maintaining the position of the condensing point spaced apart from the information recording surface of the information recording medium during reproducing of information by detection of the light received by said photodetector means.

2. An apparatus according to claim 1, wherein the light-receiving surface of said photodetector deviates from a position at which the reflected light from an upper surface of the surface layer of the information recording medium is incident on the conjugate surface.

3. An apparatus according to claim 2, wherein said illuminating optical system condenses the light beam such that a virtual image of the condensing point formed by the reflected light from the upper surface of the surface layer of the information recording medium is positioned on the information recording surface of the information recording medium.

4. An apparatus according to claim 3, wherein said light source comprises a semiconductor laser.

5. An apparatus for recording information on an information recording medium having an information recording surface and a surface layer on the recording surface for transmitting light therethrough, and for reproducing information from the information recording medium, said apparatus comprising:

a light source for generating a light beam to illuminate the recording medium, information being recorded on and being reproduced from the information recording medium during illumination of the recording medium by the light beam generated by said light source;

photodetector means for receiving light from the information recording medium illuminated by the light beam generated by said light source, and for reproducing information on the basis of detection of light received by said photodetector means, said photodetector means comprising a detecting optical system and a photodetector, said detecting optical system directing the light received from the information recording medium onto said photodetector and said photodetector receiving the light directed from said detecting optical system and, at least during reproducing of information, having a light-receiving surface disposed on a surface conjugate to the information recording surface of the information recording medium through said detecting optical system; and an illuminating optical system for condensing the light beam generated by said light source to a condensing point and for directing the condensed light beam onto the information recording medium, said illuminating optical system maintaining the position of the condensing point substantially on the information recording surface during recording of information by said light source and spaced apart from the information recording surface during reproducing of information by detection of the light received by photodetector means.

6. An apparatus according to claim 5, wherein the light receiving surface of said photodetector deviates from a position at which the reflected light from an upper surface of the surface layer of the information recording medium is incident on the conjugate surface.

7. An apparatus according to claim 6, wherein said illuminating optical system condenses the light beam such that a virtual image of the condensing point formed by the reflected light from the upper surface of the surface layer of the information recording medium is positioned on the information recording surface of the information recording medium.

8. An apparatus according to claim 7, wherein said light source comprises a semiconductor laser.

9. An apparatus according to claim 5, further comprising focusing means for changing the position of the condensing point by said illuminating optical system in conformity with the states of information recording the reproduction.

* * * * *

UNITED STATES PATENT AND TRADEMARK OFFICE
CERTIFICATE OF CORRECTION

PATENT NO. : 5,195,081
DATED : March 16, 1993
INVENTOR(S) : Masayuki Usui

It is certified that error appears in the above-indentified patent and that said Letters Patent is hereby corrected as shown below:

ON THE COVER PAGE

IN THE TITLE

Line 3, "AND OPTICAL" should read --AN OPTICAL--.

COLUMN 1

Line 4, "AND" should read --AN--; and
Line 63, "Light," should read --Light--.

COLUMN 6

Line 50, "affect" should read --effect--.

COLUMN 7

Line 62, "and" should read --and to--.

UNITED STATES PATENT AND TRADEMARK OFFICE
CERTIFICATE OF CORRECTION

PATENT NO. : 5,195,081
DATED : March 16, 1993
INVENTOR(S) : Masayuki Usui

It is certified that error appears in the above-indentified patent and that said Letters Patent is hereby corrected as shown below:

COLUMN 12

Line 23, "always is" should read --is always--; and
    Line 56, "affect" should read --effect--.

COLUMN 14

Line 41, "photodetector means" should read --said photodetector means--; and
    Line 59, "the" (second occurrence) should read --and--.

Signed and Sealed this

Seventeenth Day of May, 1994

Attest:

BRUCE LEHMAN

*Attesting Officer*     *Commissioner of Patents and Trademarks*